United States Patent
Ristock et al.

(10) Patent No.: US 10,129,406 B2
(45) Date of Patent: *Nov. 13, 2018

(54) SYSTEM AND METHOD FOR TRANSFEREE CONTROLLED PROTOCOL TRANSFERS

(71) Applicant: GENESYS TELECOMMUNICATIONS LABORATORIES, INC., Daly City, CA (US)

(72) Inventors: Herbert W. A. Ristock, Walnut Creek, CA (US); Grygoriy Budilovsky, Concord, CA (US); Vyacheslav Zhakov, Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,398

(22) Filed: Nov. 21, 2017

(65) Prior Publication Data

US 2018/0097941 A1    Apr. 5, 2018

Related U.S. Application Data

(63) Continuation of application No. 14/304,585, filed on Jun. 13, 2014, now Pat. No. 9,832,319.

(51) Int. Cl.
*H04M 3/42* (2006.01)
*H04M 3/54* (2006.01)
*H04L 29/06* (2006.01)
*H04M 3/51* (2006.01)
*H04M 7/00* (2006.01)

(52) U.S. Cl.
CPC ........ *H04M 3/541* (2013.01); *H04L 65/1006* (2013.01); *H04L 65/1096* (2013.01); *H04M 3/5183* (2013.01); *H04M 7/006* (2013.01)

(58) Field of Classification Search
CPC ........... H04M 2207/12; H04M 3/4211; H04M 3/436; H04M 3/54; H04M 3/541
USPC .... 379/212.01, 211.02, 142.01, 207.02, 188, 379/211.01
See application file for complete search history.

(56) References Cited

U.S. PATENT DOCUMENTS

| | | | |
|---|---|---|---|
| 6,587,553 B1 | 7/2003 | Shaffer et al. | |
| 6,996,219 B2 | 2/2006 | Rodriguez et al. | |
| 8,494,504 B2 | 7/2013 | Kirchhoff et al. | |
| 2006/0270362 A1 | 11/2006 | Emrich et al. | |
| 2008/0144798 A1 | 6/2008 | Sidhom et al. | |
| 2009/0202056 A1* | 8/2009 | Raghav | H04M 3/5183 379/142.04 |

* cited by examiner

*Primary Examiner* — Thjuan K Addy (57) ABSTRACT

A system and method provide an indication by a calling device of a transfer preference for an interaction with a called device. The called device is enabled or restricted to transfer the interaction based on the transfer preference. The transfer preference is provided by a session initiation protocol or various other call topologies.

12 Claims, 6 Drawing Sheets

SYSTEM AND METHOD FOR TRANSFEREE CONTROLLED PROTOCOL TRANSFERS

CROSS-REFERENCE TO RELATED APPLICATION(S)

This application is a continuation of U.S. patent application Ser. No. 14/304,585, filed on Jun. 13, 2014, now U.S. Pat. No. 9,832,319, the content of which is incorporated herein by reference.

BACKGROUND

Communication protocols, e.g., the session initiation protocol (SIP) which is an Internet Engineering Task Force (IETF) standard protocol, can initiate an interactive user session that can involve multimedia elements, e.g., video, voice, chat, gaming, virtual reality, etc. In one implementation, an outbound call center can make outbound calls to customers on behalf of a business or client via the protocol such as SIP. Various other implementations can also use protocols such as SIP.

BRIEF DESCRIPTION OF THE DRAWINGS

In association with the following detailed description, reference is made to the accompanying drawings, where like numerals in different figures can refer to the same element. The drawings also include SIP message numbers, e.g., 200 OK and 202 Accepted, which numbers are different than the drawing reference numerals.

DETAILED DESCRIPTION

Systems and methods can provide for transferee control of protocol transfers, e.g., session initiation protocol (SIP) transfers. In one implementation, the transferee control can help ensure that outbound calling rules are complied with. For example, the calling party can instruct and/or provide a suggestion to the destination of how to handle redirecting of a call, e.g., by restricting and/or encouraging call redirecting. For example, a transfer of a call from one device to another device, e.g., a fixed device to a mobile device, can be restricted and/or encouraged based on the rules. The systems and methods can be used for contact centers, enterprise telephony, etc., including consumer communications. The calls can include pre-recordings, e.g., served with interactive voice response (IVR) technologies, or live calls by agents.

Figure 1:
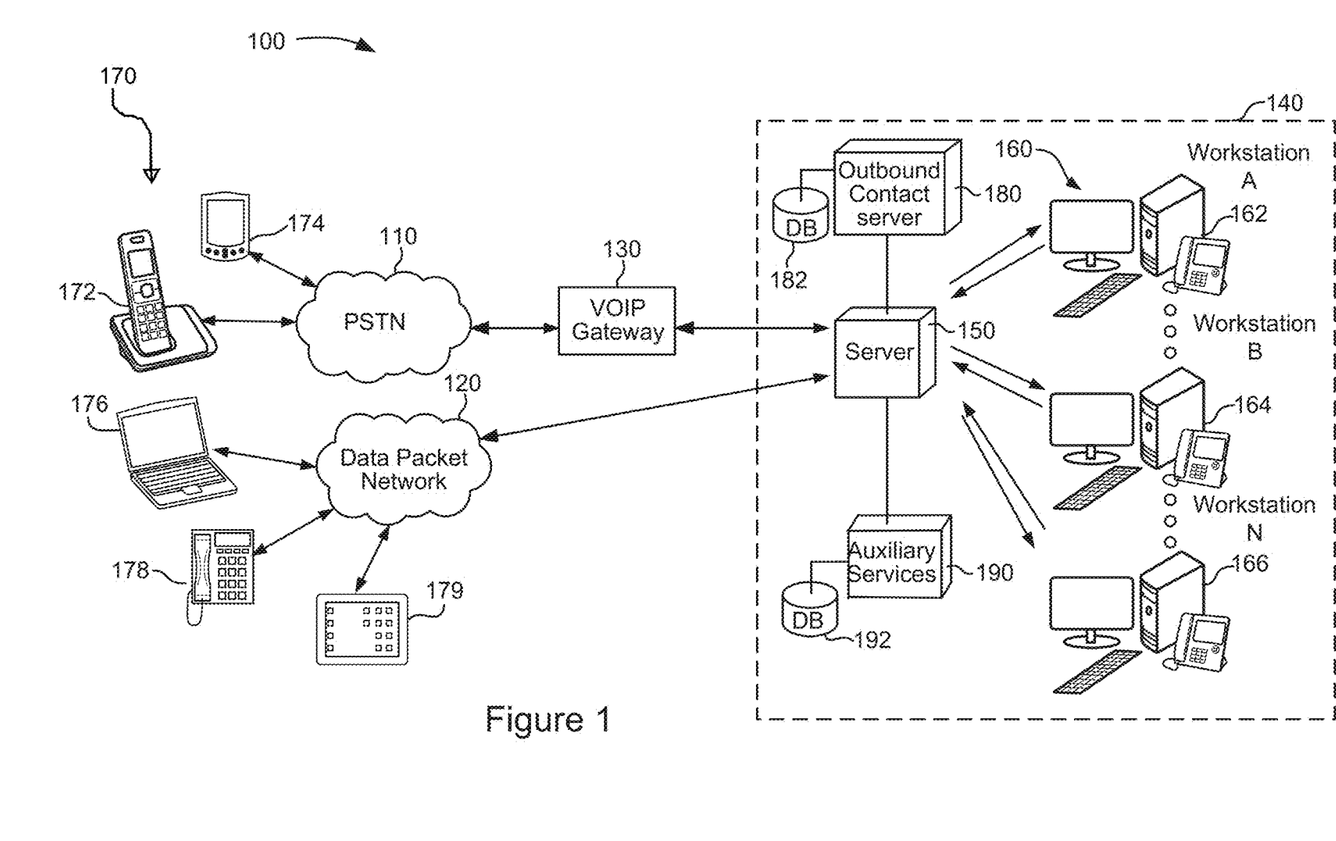
FIG. 1 is a block diagram of an exemplary communication network.

FIG. 1 is a block diagram of an exemplary communication network 100 with communication protocol, including session initiation protocol (SIP), capability. For purposes of explanation the systems and methods are described for SIP but they can be used with other application layer protocols, e.g., hypertext transfer protocol (HTTP), simple mail transfer protocol (SMTP), etc., or various other call topologies. Communication network 100 can include a public switched telephone network (PSTN) 110, a data-packet network 120, e.g., the Internet, a voice over Internet protocol (VoIP) gateway 130 and a telecommunications center 140, e.g., call center and/or contact center. Calls made from the center can include telemarketing, sales, fund-raising, etc. calls, as well as calls for contact list updating, surveys or verification services. A call center may handle either outbound or inbound calls exclusively or may handle a combination of the two. The communication network 100 can include more or less of the elements shown depending on an implementation of the communication network 100. The data-packet network 120 can include an Internet backbone and Internet server configured to serve SIP. The PSTN 110 can include telephone lines, fiber optic cables, microwave transmission links, cellular networks, communications satellites, undersea telephone cables, etc., interconnected by switching centers. The PSTN 110 can be another type of telephone network, e.g., a private telephone network.

The VoIP gateway connects with the PSTN 110 to convert the signaling portion of telephony traffic into signals for transmission to a server 150 of the telecommunications center 140, and the media portion can be converted to real-time transport protocol (RTP). The signals can include SIP signals and the server 150 can include a SIP server, e.g., a device and/or application, like SIP switch, call manager or session border controller that manages the communications, referred to herein as the server 150. The VoIP gateway 130 can be incorporated with the server 150 or a stand-alone device. The telecommunications center 140 can include a private branch exchange (PBX) or IP PBX incorporated together with the server 150 or separate from the server 150 to accommodate enterprise telephony within the telecommunications center 140. The telecommunications center 140 also includes an outbound contact server 180 and database 182 to initiate outbound calls/interactions via the server 150. For example, the server 150 can process outbound interactions based on the types of interactions. There can be a variety of rules regulating the interactions, e.g., rules stored in database 182, for different campaigns. For example, telephone numbers, email addresses and/or Internet protocol (IP) addresses can be dialed or served for a determined campaign based on the rules. The rules can also include suggested transfer targets, for enabling or restricting transfers. The database 182 can also maintain call list data and rules or suggestions.

In one implementation, interactions that are reminders or sales calls to a called party 170 may not be considered as urgent as interactions related to fraud detection. To receive calls, the called party 170 may use various devices, e.g., a fixed-phone 172, mobile communication device 174, e.g., personal digital assistant (PDA), smart phone, mobile phone, etc., fixed computer 176, fixed Internet protocol (IP) phone 178, and/or mobile computer, e.g., tablet 179, etc. For non-urgent interactions the telephone numbers, IP address, etc. of the called party 170 may be limited to a reduced set of the total devices, e.g., limited to numbers for fixed devices. Also, the time of day to send the interactions may be limited to times convenient for the interaction recipient, e.g., not nighttime. For urgent interactions, e.g., calls related to fraud detected by a bank or credit card company, etc., the numbers of the called party 170 that can be contacted may be expanded, e.g., to fixed-devices and mobile devices, and the time of day expanded, e.g., to any time of day including the nighttime when the fraud is detected. The server 150 can attempt to make the call to the fixed device, e.g., fixed-phone 172, fixed computer 176, IP phone 178, of the called party 170 and then redirect the call to the mobile device, e.g., mobile communication device 174, tablet 179, etc., of the called party 170 if there is no answer at the fixed device.

The telecommunications center 140 can also receive inbound calls, e.g., at workplace 160 (e.g., workstation A (162), workstation B (162) through workstation N (166)) of the telecommunications center 140, e.g., call center/contact center. The called party 170 may become the calling party, e.g., by replying to an outbound interaction. The server 150 can process the handling of inbound calls, interactions, etc. between the fixed-phone 172, mobile communication device 174, computer 176, IP phone 178, tablets 179, etc. and the workplace 160. In this example, there are three workstations A (163), workstation B (164) and workstation N (166) within telecommunications center 140. Depending on an implementation, there may be more than three workstations as noted by the A-N designation. The workplace 160 can be adapted with a personal computer (PC), e.g., wireline and/or wireless, and/or a SIP telephone, e.g., fixed and/or mobile. There may be more equipment types provided in and operational in a workstation including facsimile stations and so on. Additionally or alternatively, IP-capable telephones can be connected to their respective PCs, e.g., through a PC sound card enabling the IP phones to take calls through the PC.

Supplemental services such as call routing or media services for playing voice recording and reporting services, e.g., provided by auxiliary services 190 and one or more data repositories 192 can connect with the server 150 to provide data regarding client and agent information as may be used to enhance call routing function. The auxiliary services 190 can include one or more of media services (RTP), enhanced routing, e.g., contact center skills based routing, IVR, reporting, configuration, dial plan, voice mail, etc. The auxiliary services 190 can serve data from the auxiliary services 190 to the server 150 or the server 150 can access the data directly from the auxiliary services 190. The data may be accessed by the server 150 upon request. Updates to the data may be made periodically, e.g., as events arrive and are routed with the telecommunications center 140. Types of data stored in auxiliary services 190 may include, but are not limited to, agent information such as log-in status, availability data, skill data, language data, identification data, address data, etc. Client information contained in auxiliary services 190 may include client history data, client identification data, contact information, payment history data, order status data, etc.

Figure 2:
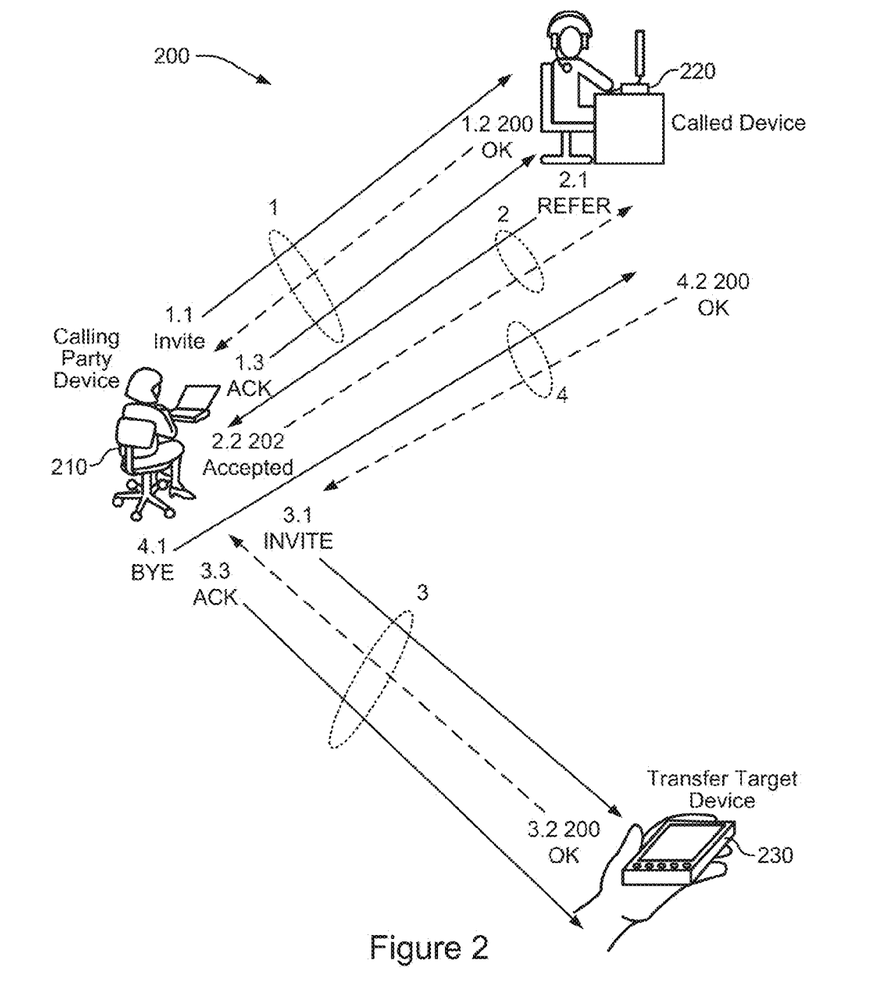
FIG. 2 is a block diagram of an exemplary SIP session from an outbound contact server.

FIG. 2 is a block diagram of an exemplary SIP session 200 from an outbound calling party device 210. For example, the caller can be the outbound contact server 180 of FIG. 1 or another caller. In one example, the calling party device 210 intends to send an outbound interaction to a determined called device 220, e.g., a fixed-phone 172, and the called device 220 may have call forwarding enabled to forward the call to a determined transfer target device 230, e.g., mobile communication device 174. The fixed-phone 172 becomes the transferor and the calling party device 210 the transferee. The fixed-phone 172 and mobile communication device 174 are used for explanation purposes. Other devices that communicate with each other can be used in their place and work with the described systems and methods.

Sending the outbound interaction to the transfer target device 230 may be allowed by the rules, e.g., for urgent outbound interactions. If the rule does not allow the outbound interaction to be sent to a mobile device, e.g., transfer target device 230, that is addressed in below implementations. The calling party device 210 establishes the new SIP session with the called device 220, e.g., utilizing an invite transaction (1). For example, the Internet Engineering Task Force (IETF) Request for Comment RFC5589 describes such an INVITE. The systems and methods can be utilized with the transfer types described in RFC5589. The calling party device 210 sends the invite to the called device 220 (1.1). The called device 220 responds to the invite with a response that the invite was successful, e.g., 200 OK (1.2). The calling party device 210 can acknowledge receiving the response, e.g., with ACK request (1.3). That finishes the invite transaction and the parameters of communication between the calling party device 210 and the called device 220 are properly negotiated. The calling party device 210 and the called device 220 can communicate using one or more media, e.g., audio, video, chat, etc.

In one example, during communication, the called device 220 wishes to leave the call and transfer the call to the transfer target device 230 (2). The called device 220 sends a transfer message to the calling party device 210, e.g., a REFER message (2.1). The calling party device 210 accepts the transfer request by the called device 220, e.g., with a 202 Response (2.2). The calling party device 210 can start a new session to the transfer target device 230, e.g., according to instructions provided in REFER transaction (3). The calling party device 210 sends an invite message to the transfer target device 230 (3.1). The transfer target device 230 responds that the invite was successful, e.g., with a 200 OK message (3.2). The calling party device 210 acknowledges receiving the response, e.g., with an ACK request message (3.3). The calling party device 210 can terminate the session with the called device 220 (4). The calling party device 210 sends a termination request to the called device 220, e.g., BYE request message (4.1). The called device 220 confirms the termination request, e.g., with a 200 OK message, and leaves the call (4.2). The calling party device 210 and the transfer target device 230 can continue to communicate.

Figure 3:
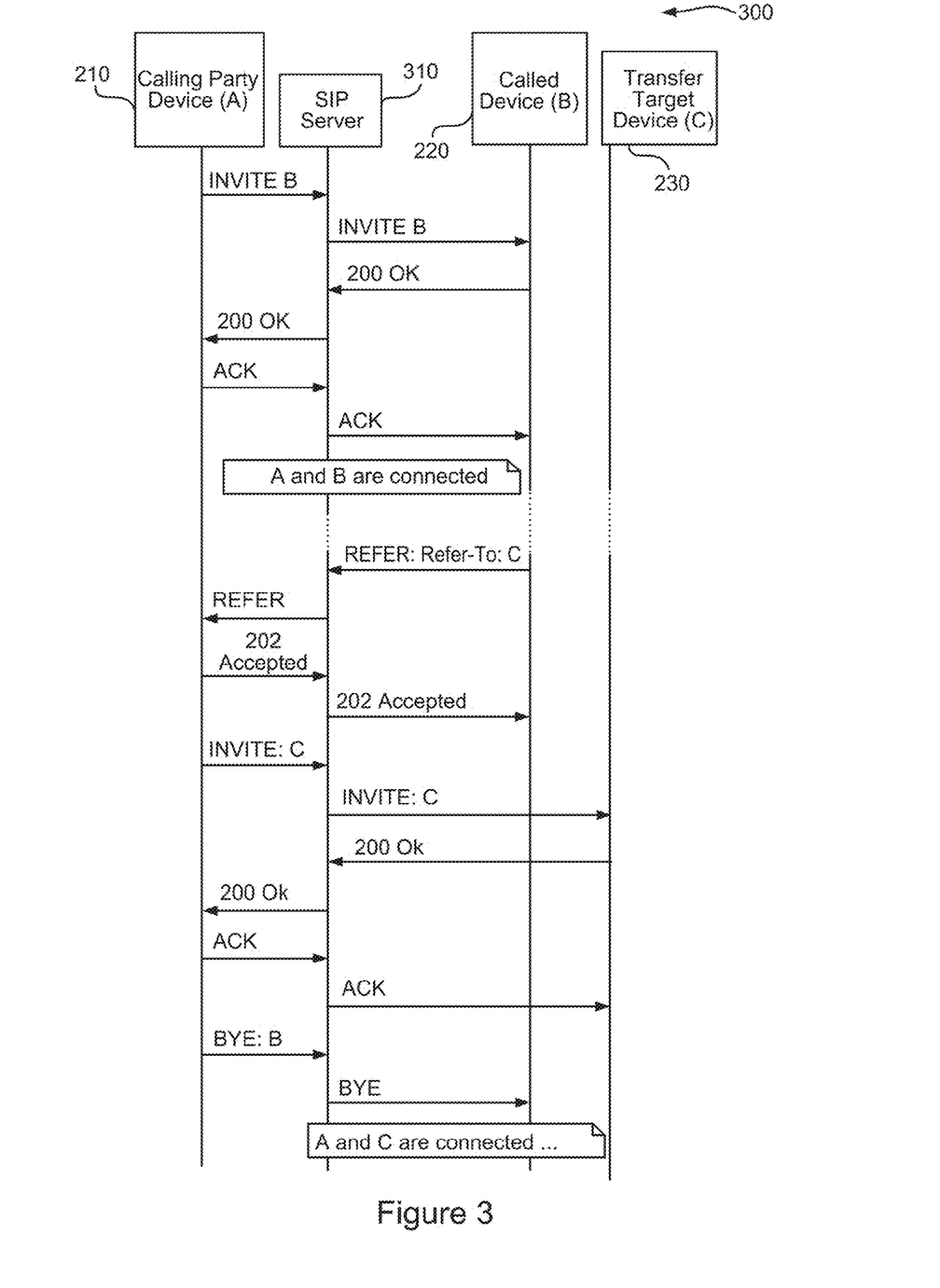
FIG. 3 is a block diagram of an exemplary SIP session including a SIP server.

FIG. 3 is a block diagram of an exemplary SIP session 300 including a SIP server 310. The SIP server 310 can include the same or a different server as server 150 in the contact center example of FIG. 1. As used herein, the SIP server 310 is for explanation purposes, and other types of servers can be used depending on the communication protocol implementation. The SIP server 310 is part of the outbound messaging rather than the SIP end points communicating with each other directly as they did in FIG. 2. In this implementation, the SIP server 310 is transparent to communications between the call participants, e.g. the calling party device 210, the called device 220 and the transfer target device 230. The calling party device 210 sends a communication invitation message to the called device 220 (e.g., INVITE), the called device 220 sends a successful invite message (e.g., 200 OK) to the calling party device 210, and the calling party device 210 sends an acknowledgement message (e.g., ACK) to the called device 220 to complete the communication connection. The SIP server 310 can pass the messages.

If the called device 220 is to transfer the connection to the transfer target device 230, the fixed-phone can send a transfer request (e.g., REFER) through the SIP server 310 to the calling party device 210. Therefore, the transfer message is propagated back to the calling party device 210. The calling party device 210 sends a transfer request acknowledgment message (e.g., 202 Accepted) through the SIP server 310 to the called device 220 and performs the fixed-phone recommended transfer action by sending a communication invitation to the transfer target device 230 (e.g., INVITE) through the SIP server 310. Alternatively, the calling party device 210 can reject the transfer recommendation and ignore the transfer. If the invitation is sent to the transfer target device 230, the transfer target device 230 can send a successful response message (e.g., 200 OK) which is acknowledged by the calling party device 210 (e.g., ACK). The calling party device 210 can terminate the communication connection with the called device 220 (e.g., BYE). The calling party device 210 and transfer target device 230 are connected. Again, the SIP server 310 can pass the messages.

Figure 4:
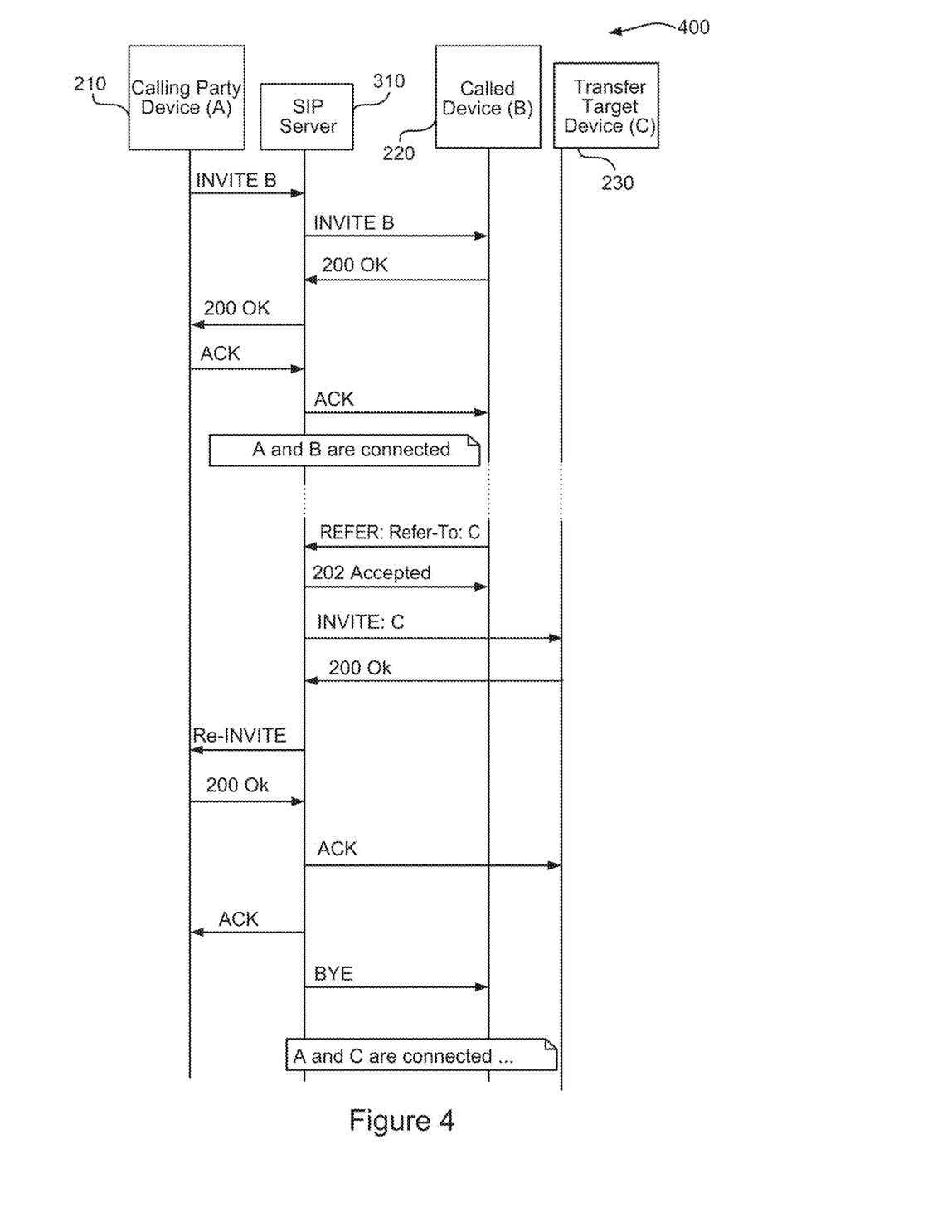
FIG. 4 is a block diagram of an exemplary SIP session including a SIP server handling transfer interactions.

FIG. 4 is a block diagram of an exemplary SIP session 400 including a SIP server 310 transfer. After the calling party device 210 and the called device 220 connect (e.g., via INVITE, 200 OK and ACK messages), the called device 220 wants to transfer the communication connection to the transfer target device 230. Instead of propagating the transfer message (e.g., REFER) from the fixed-phone to the calling party device 210, the SIP server 310 processes the transfer message and sends an accepted for processing message (e.g., 202 Accepted) to the called device 220. The SIP server 310 can then send an invitation message (e.g., INVITE) to the transfer target device 230 to connect with the calling party device 210. The transfer target device 230 can accept the invitation by sending a success message (e.g., 200 OK). Upon receiving the response of the transfer target device 230, the SIP server 310 connects the mobile communication device to the calling party device 210 (e.g., via a re-INVITE transaction). Therefore, the SIP server 310 converts a REFER message to a re-INVITE message. This way the SIP server 310 may perform the transfer even if the calling party device 210 does not support transfer messages (e.g., REFER). The calling party device 210 may not be aware that the transfer was performed. Rather, the re-INVITE message may appear to the calling party device 210 as a session refreshment.

Additionally or alternatively, the transfer can be triggered not by the SIP server 310 but by a third party request sent to the SIP server 310 from a software client. The SIP server 310 may execute this request converting the request to a transfer message (e.g., REFER) sent to the calling party device 210 similar to the procedure of FIG. 3, or by performing a re-INVITE procedure similar to procedure of FIG. 4. After the transfer, the calling party device 210 and the transfer target device 230 are connected.

Figure 5:
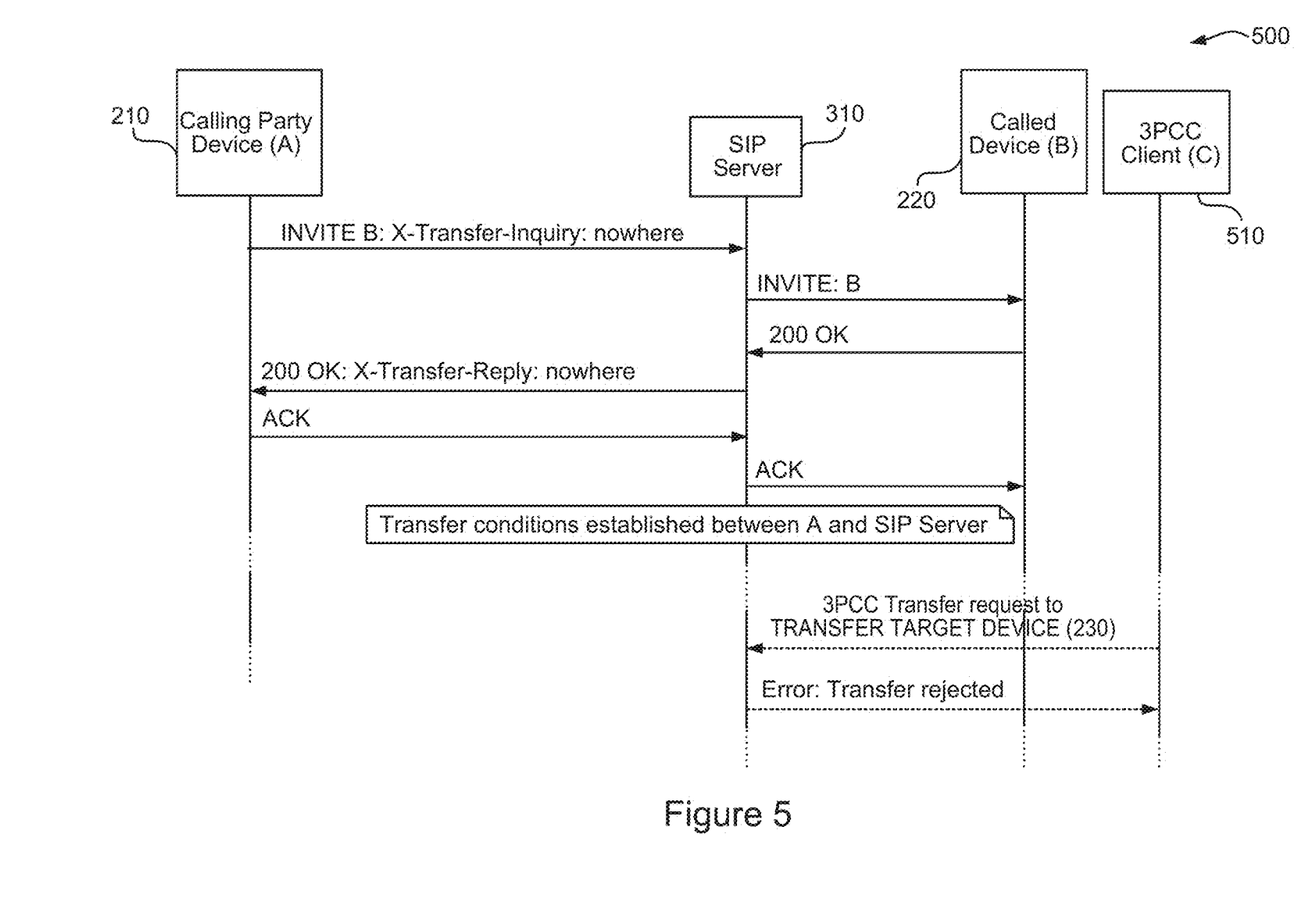
FIG. 5 is a block diagram of an exemplary SIP session including a third party call control client.

FIG. 5 is a block diagram of an exemplary SIP session 500 including a third party call control (3PCC) client. In addition to the transfer practice described in FIG. 3 and FIG. 4, the calling party device 210 can utilize messages to control of a direction of transfer where the called device 220 may send the call, e.g., control messages shown in FIG. 5. There can be instances in which it is desirable for the transferee, e.g., calling party device 210, to control whether or not the call is transferred from one device to another device. The transferee, e.g., calling party device 210, can indicate preferences regarding potential call transfers by the called device 220. For example, for a telecommunication center 140 sending outbound calls, there can be rules or suggestions associated with the outbound calls. In one implementation of the rules or suggestions, it is acceptable to send calls to called device 220 for all campaigns at any time of day, but only acceptable to send the calls to the transfer target device 230 for a subset of the campaigns and only before a determined time of day, e.g., 4 PM. Therefore, it can be desirable to prevent a transfer of the call from one type of device to another type of device, or from end point to another end point, e.g., from the called device 220 to the transfer target device 230, in some instances. Other factors can be included in the determination of whether to transfer the call to another device, e.g., a location of the device. For example, if the device is located outside of the country the transfer can be prohibited.

To control a transfer of communication connections, the following target types can be identified: targets prohibited for transfer, targets allowed for transfer and targets suggested for transfer if there is a need for a transfer. Additional or alternative targets can be determined. To implement the target control, logical network end-points in the communication network 100 can act as a SIP user agent (UA) to manage the SIP session. The SIP user agent can identify itself using a message header field 'User-Agent'. The SIP user agent can negotiate transfer conditions/preferences during any regular INVITE transaction, e.g., an initial INVITE transaction, which establishes the SIP Session and/or during any re-INVITE transaction for the SIP session. Since any of the SIP protocol session participants may initiate a transfer, transfer negotiation can provide symmetrical capabilities for both peers in the transfer. The transfer control can be utilized by any SIP end point, and can be utilized by a centralized control application, e.g., the SIP server 310.

The calling party device 210 invites the called device 220 to join a communication session (e.g., INVITE). To accommodate transfer control based on determined conditions/preferences, an X-Transfer-Inquiry header and X-Transfer-Reply header are included in the SIP protocol. The X-Transfer-Inquiry header delivers information to the peer addresses or telephone numbers that the sender desires to restrict, allow or prefer possible future transfers. The X-Transfer-Reply header is a response to the transfer inquiry. The receiver of the transfer inquiry makes a commitment to follow the sender recommendation regarding a possible future transfer or rejects the recommendation.

The SIP endpoints e.g., the calling party device 210 and the called device 220, can negotiate transfer conditions/preferences during the SIP session connection. Any user agent, e.g., client or server user agent, can request a transfer restriction, transfer allowance, or transfer preferences at any stage of the SIP session. To continue with the example for explanation purposes, the calling party device 210, e.g. acting as the user agent client, sends a transfer inquiry with a transfer restriction (e.g., nowhere) during the invite (e.g., INVITE: Bob; X-Transfer-Inquiry: nowhere). The SIP server 310, e.g., acting as the user agent server, sends an invitation to the called device 220 to connect to the called device 220 (e.g., INVITE). The fixed phone responds affirmatively (200 OK). The SIP server 310 replies to the calling party device 210, and includes an agreement in the reply to not transfer the call (e.g., 200 OK; X-Transfer-Reply: nowhere). Additionally, the SIP server 310 can send its own inquiry regarding the transfer conditions/preferences to the calling party device 210 in response to the invitation. Calling party device 210 upon receiving the inquiry provides the reply while acknowledging the invitation. The calling party device 210 acknowledges the SIP server's reply (e.g., ACK), and the connection is established between the calling party device 210 and the called device 220. The transfer condition/preference is also established between the calling party device 210 and the SIP server 310 to not allow the called device 220 to transfer the call. The transfer condition/preference can allow for all types of transfer, e.g., no restrictions.

For example, the no transfer request can be established in response to a rule for the outbound call which indicates that the call is intended for the phone number of a fixed phone, and may not be transferred. The rule can be determined, for example, to not bother a customer by calling their mobile phone when the call is intended for the customer's fixed phone only. If the fixed phone transfers the call to the customer's mobile phone outside the control of the calling party device 210 the rule is violated. When the third party call control 510 invites the calling party device 210 to transfer the communication connection away from the called device 220, e.g., to device transfer target device 230, the SIP server 310 can intervene to reject the transfer on behalf of the calling party device 210 based on the earlier agreement with the calling party device 210 to not transfer, e.g., because the transferred call can violate a transfer condition/preference (Error: transfer rejected). The rejection can be contained within the acknowledgement (e.g., ACK request). Since the reply to the transfer request can comply with the transfer inquiry or not, a message with the reply which does not comply with the inquiry can contain a header warning with the wording "x-transfer list extended". If the reply does not comply with the inquiry any user agent may terminate SIP dialog, e.g., with a SIP BYE request. The called device 220 can inform the calling party device 210 about denial of the demand or ignore the demand of the calling party 210 without information.

While various formats for the SIP header X-Transfer-Inquiry can be used, in one implementation the SIP header X-Transfer-Inquiry can contain a comma-separated list of targets in the form of SIP uniform resource identifier (URIs) or telephone numbers. The entries in the list can contain parameters separated from the entry with a semicolon. Exemplary transfer condition/preference parameters include: parameter "restrict" requests the receiver not transfer the call to the preceding SIP URI or number; parameter "allow" informs the receiver that the receiver may transfer the call to the preceding SIP URI or number; and parameter "prefer" informs the receiver that the receiver may transfer the call to the preceding SIP URI or number if there are conditions/preferences for transfer. The "prefer" parameter can be useful for deployments with SIP PBX or SIP servers, which may need to know where to send the call if the initial target is dropped from the call or not available. Other parameters are possible. For example, in addition to the list of targets the header may contain the "nowhere" keyword. The keyword "nowhere" can disable the transfer to any target apart of mentioned in the list with "allow" or "prefer" parameters. If "nowhere" is the only word in the header the transfer is prohibited everywhere.

Examples of header X-Transfer-Inquiry include: X-Transfer-Inquiry: nowhere is a request to not transfer the call at all; X-Transfer-Inquiry: sip:Carol@gorgia.com;restrict is a request to not transfer the call to Carol; X-Transfer-Inquiry: nowhere, sip:Carol@gorgia.com; allow can identify that the transfer is prohibited everywhere but to Carol; X-Transfer-Inquiry: sip:Bob@atlanta.com;prefer,sip:Carol@gorgia.com;prefer if there is a need in transfer, try first Bob, then Carol, or transfer to Bob and Carol at the same time. Additional or alternative to forwarding the call to a telecommunication device, the call can be forwarded to another device, for example a voice recorder.

Figure 6:
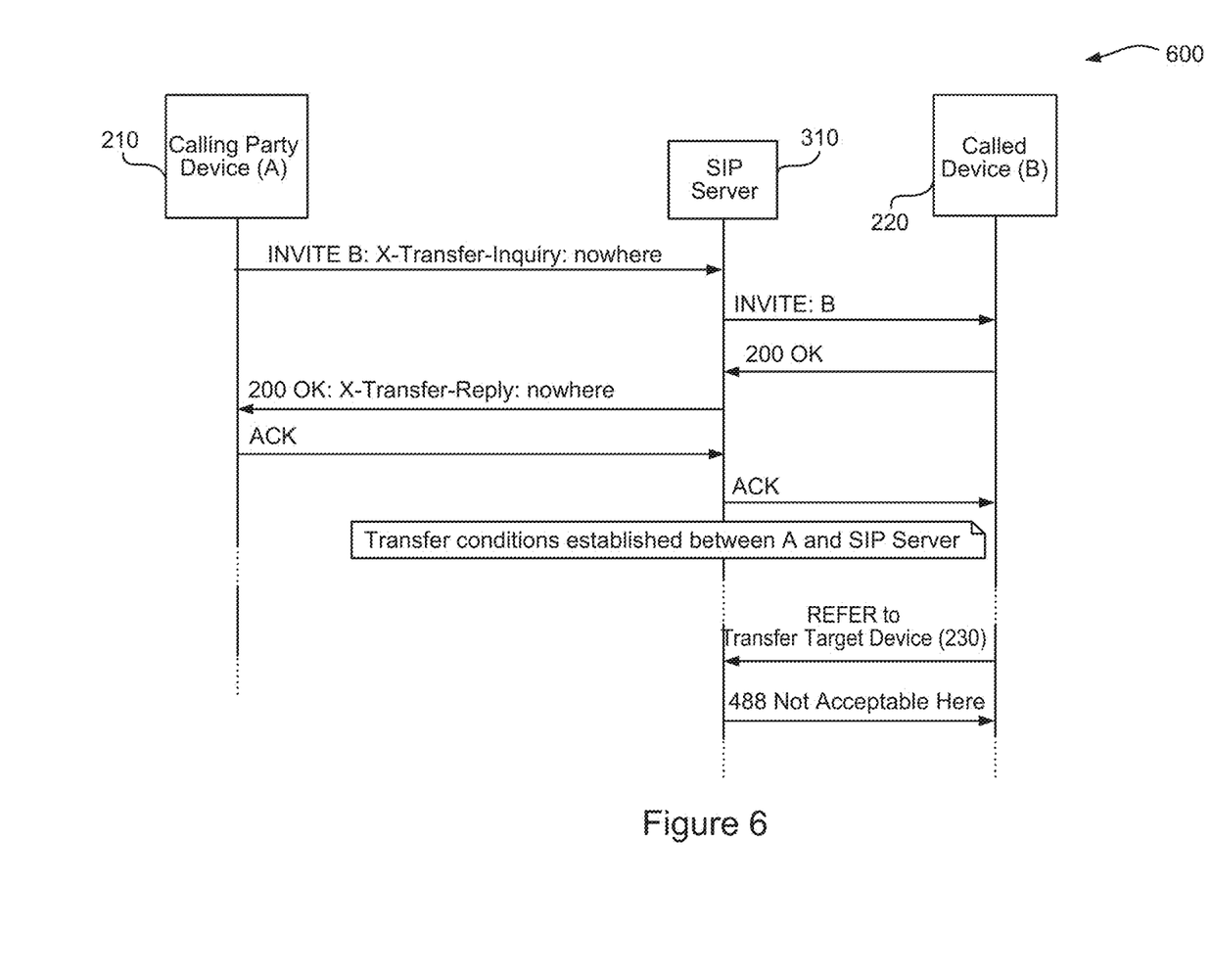
FIG. 6 is a block diagram of an exemplary SIP session including halting a transfer that violates a transfer condition/preference.

FIG. 6 is a block diagram of an exemplary SIP session 600 including halting a transfer that violates a transfer condition. The calling party device 210 sends a transfer inquiry with a transfer restriction (e.g., nowhere) during the invite (e.g., INVITE: Bob; X-Transfer-Inquiry: nowhere). The SIP server 310, e.g., acting as the user agent server, sends an invitation to connect the called device 220 (e.g., INVITE). The fixed phone responds affirmatively (200 OK). The SIP server 310 replies to the calling party device 210, and includes an agreement in the reply to not transfer the call (e.g., 200 OK; X-Transfer-Reply: nowhere). The calling party device 210 acknowledges the reply (e.g., ACK), the connection is established between the calling party device 210 and the called device 220. The transfer condition/preference is also established between the calling party device 210 and the SIP server 310 to not allow the called device 220 to transfer the call.

For a format of the SIP header X-Transfer-Reply, the header can contain a comma-separated list of targets in the form of SIP URIs or telephone numbers. The entries in the list can contain parameters separated from the entry with semicolon. Available parameters can include: parameter "restricted" informs that sender of the reply to commit not transfer the call to the preceding SIP URI or number; parameter "allowed" informs that sender of the reply can transfer the call to the preceding SIP URI or number; parameter "preferred" informs that sender of the reply to prioritize the preceding SIP URI or number if there are conditions/preferences for transfer. In addition to the list of targets the header may contain the "nowhere" keyword. The keyword identifies that the replier committed to disabling the transfer to any target apart of mentioned in the list with "allowed" or "preferred" parameters. Since the nowhere keyword was included in the invite and reply, when the called device 220 attempts to transfer to the call to device transfer target device 230 (REFER), the SIP server 310 can reply to the called device 220 that some aspect of the session description or the request-URI is not acceptable (e.g., 488 Not Acceptable Here). If transfer of the call is stopped, an answering machine of the called device may activate to record the call.

Examples of header X-Transfer-Reply include: X-Transfer-Reply: nowhere, the replier makes the commitment do not transfer the call; X-Transfer-Reply: sip:Carol@gorgia.com;restricted, the replier makes the commitment do not transfer the call to Carol; X-Transfer-Reply: nowhere, sip:Carol@gorgia.com;allowed, the replier may transfer the call only to Carol; X-Transfer-Reply: sip:Bob@atlanta.com;prefered,sip:Carol@gorgia.com;prefered, if there will be need in transfer, replier will try first Bob, then Carol.

The following is an example of full SIP negotiation of transfer restriction.

A user agent client (UAC) sends an invitation to make a SIP connection:
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
X-Transfer-Inquiry: nowhere
Call-ID: a84b4c76e66710
CSeq: 314159 INVITE
Contact: <sip:alice@pc33.atlanta.com>
Content-Type: application/sdp
Content-Length: 142

Alice's session description protocol (SDP) is not shown. The X-Transfer-Inquiry indicates that the interactions are not to be transferred.

The user agent server (UAS) sends the response:
SIP/2.0 200 OK
Via: SIP/2.0/UDP pc33.atlanta.com;branch=z9hG4bKnashds8;received=192.0.2.1
To: Bob <sip:bob@biloxi.com>;tag=a6c85cf
From: Alice <sip:alice@atlanta.com>;tag=1928301774
X-Transfer-Reply: nowhere X-Transfer-Inquiry: tel:19004567890;restrict,sip:georgia.com;restrict
Call-ID: a84b4c76e66710
CSeq: 314159 INVITE
Contact: <sip:bob@192.0.2.4>
Content-Type: application/sdp
Content-Length: 131

Bob's SDP is not shown. Bob replied to Alice that the interaction from Alice is not to be transferred. Bob asked Alice not to transfer the interaction to 19004567890 and not to transfer the interaction to georgia.com.

The UAC acknowledges the transaction:
ACK sip:bob@192.0.2.4 SIP/2.0
Via: SIP/2.0/UDP pc33.atlanta.com;branch=z9hG4bKnashds9
Max-Forwards: 70
To: Bob <sip:bob@biloxi.com>;tag=a6c85cf
From: Alice <sip:alice@atlanta.com>;tag=1928301774
X-Transfer-Reply: tel:19004567890;restricted,sip:georgia.com; restricted
Call-ID: a84b4c76e66710
CSeq: 314159 ACK
Content-Length: 0

Both user agents in replies confirm peer inquires. As a result of negotiation, Bob made a commitment to not transfer a call from Alice. Alice made a commitment to avoid a transfer to the number 19004567890 or SIP URI which belongs to georgia.com domain.

The following is an example of transfer conditions/preferences negotiation when the peer extends transfer conditions/preferences and other peer drops the call since the reply did not match the inquiry.

Alice to Bob inside INVITE:
X-Transfer-Inquiry: sip:bob@one.com;restricted,sip:bob@two.com;restricted Bob to Alice inside 200 OK:
X-Transfer-Reply: sip:bob@one.com;restricted,sip:bob@georgia.com;allowed
Warning: x-transfer list extended
X-Transfer-Inquiry: nowhere Alice to Bob inside ACK:
X-Transfer-Reply: nowhere Alice sends BYE to Bob. As a result of negotiation Bob insists on extending the X-Transfer list compared to the list requested by Alice. Alice cannot agree with extension and terminates the session.

Below is an example of transfer a condition/preference negotiation when one peer extends a transfer conditions/preferences and other peer agrees to the transfer condition. Even though the reply does not match the inquiry, the call stays.

Alice to Bob inside INVITE:
X-Transfer-Inquiry: sip:bob@one.com;restricted,sip:bob@two.com;restricted Bob to Alice inside 200 OK:
X-Transfer-Reply: sip:bob@one.com;restricted, sip:bob@two.com;allowed Warning: x-transfer list extended Alice sends an acknowledgement to Bob and does not terminate the session with BYE. As a result of negotiation Bob, Bob did not fully satisfy the Alice request. Despite that, Alice decided stay on the call.

The examples can assume that server 150 and SIP server 310 works as a back-to-back user agent (B2BUA) and applies local policy to establish transfer limitations with the called device 220 during session connection phase. The examples are for explanation purposes and not to limit the systems and methods. For example, the systems and methods can be used for inbound calls as well as outbound calls. For example, the inbound call is not to be redirected to an agent in the Philippines. The systems and method can also be used for architectures other than contact centers. The systems and methods can also be extended to other media including short message service (SMS)/multimedia messaging service (MMS). Additionally or alternatively, when redirecting email to an archive destination, which can be viewed later by a customer, a next best contact can be used to reach the customer quicker, e.g., social media.

The systems and methods described above may be implemented in many different ways in many different combinations of hardware, software firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

The invention claimed is:

1. A method for providing outbound contact services for a contact center, the method comprising:
   receiving, by a processor, from a calling device, a first signaling message for establishing an outbound call to a called device, the signaling message including conditions for transferring the outbound call to a transfer device other than the called device;
   transmitting, by the processor, to the calling device, acknowledgment of the conditions for transferring the outbound call to the transfer device;
   sending, by the processor, a second signaling message to the called device for establishing a communication session between the calling device and the called device;
   receiving in response to the second signaling message, by the processor, from the called device, a third signaling message inviting the calling device to transfer the call to the transfer device;
   determining, by the processor, whether the transfer violates the conditions for transferring the outbound call;
   in response to determining that the transfer violates the conditions, transmitting, by the processor, a fourth signaling message rejecting the invitation to transfer the call.

2. The method of claim 1, wherein the first, second, third, and fourth signaling messages are messages adhering in a voice-over-IP signaling protocol.

3. The method of claim 1, wherein the transfer device is associated with a phone number or email address, and the conditions relate to the phone number or email address.

4. The method of claim 1 further comprising:
   terminating, by the processor, connection with the called device in response to determining that the transfer violates the conditions.

5. The method of claim 1 further comprising:
   transmitting, by the processor, a notification to the calling device in response to determining that the transfer violates the conditions.

6. The method of claim 1, wherein the conditions identify at least one of a time of day, location of the transfer device, type of transfer device, or communication campaign invoked in making in the outbound call.

7. A system for providing outbound contact services for a contact center, the system comprising:
   processor; and
   memory, wherein the memory includes instructions that, when executed by the processor, cause the processor to:
      receive from a calling device, a first signaling message for establishing an outbound call to a called device, the signaling message including conditions for transferring the outbound call to a transfer device other than the called device;
      transmit to the calling device, acknowledgment of the conditions for transferring the outbound call to the transfer device;
      send a second signaling message to the called device for establishing a communication session between the calling device and the called device;
      receive in response to the second signaling message, from the called device, a third signaling message inviting the calling device to transfer the call to the transfer device;
      determine whether the transfer violates the conditions for transferring the outbound call;
      in response to determining that the transfer violates the conditions, transmit a fourth signaling message rejecting the invitation to transfer the call.

8. The system of claim 7, wherein the first, second, third, and fourth signaling messages are messages adhering in a voice-over-IP signaling protocol.

9. The system of claim 7, wherein the transfer device is associated with a phone number or email address, and the conditions relate to the phone number or email address.

10. The system of claim 7, wherein the instructions further cause the processor to:
    terminate connection with the called device in response to determining that the transfer violates the conditions.

11. The system of claim 7, wherein the instructions further cause the processor to:
    transmit a notification to the calling device in response to determining that the transfer violates the conditions.

12. The system of claim 7, wherein the conditions identify at least one of a time of day, location of the transfer device, type of transfer device, or communication campaign invoked in making in the outbound call.

* * * * *